Dec. 10, 1940.  A. KINGSBURY  2,224,652
BEARING
Filed Jan. 24, 1938  3 Sheets-Sheet 1

Fig. 1.

Inventor
Albert Kingsbury.

By Cameron, Kerkam + Sutton
Attorneys

Dec. 10, 1940.  A. KINGSBURY  2,224,652
BEARING
Filed Jan. 24, 1938  3 Sheets-Sheet 2

Inventor
Albert Kingsbury.
By Cameron, Kerkam & Sutton
Attorneys

Dec. 10, 1940.  A. KINGSBURY  2,224,652
BEARING
Filed Jan. 24, 1938  3 Sheets-Sheet 3
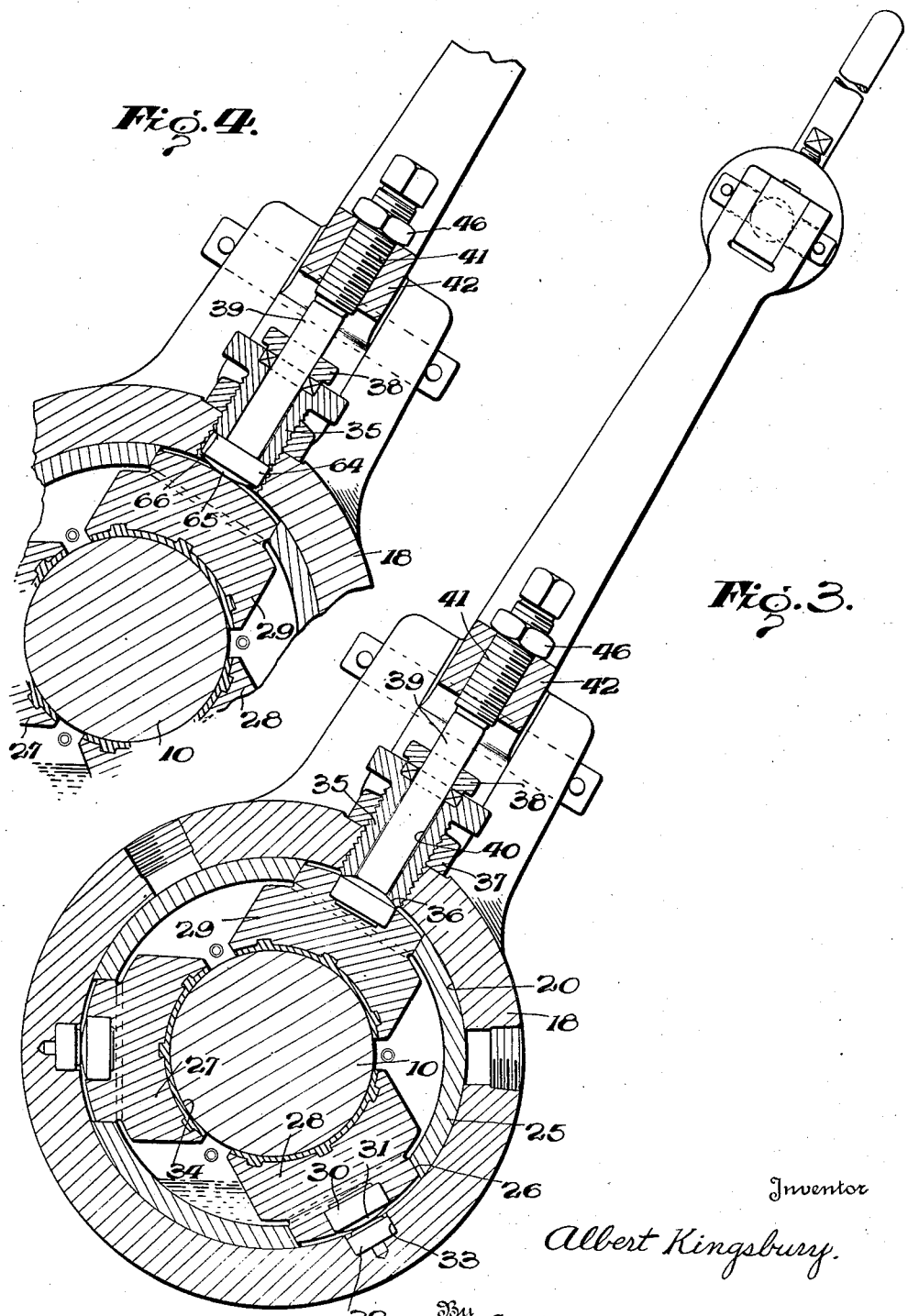
Inventor
Albert Kingsbury.
By Cameron, Kerkam & Sutton
Attorneys Patented Dec. 10, 1940

2,224,652

UNITED STATES PATENT OFFICE 2,224,652

BEARING

Albert Kingsbury, Greenwich, Conn., assignor to Kingsbury Machine Works, Inc., Philadelphia, Pa., a corporation of Delaware Application January 24, 1938, Serial No. 186,742

18 Claims. (Cl. 308—73)

This invention relates to bearings for grinder spindles, and has for its object to provide a grinder spindle with improved thrust and radial bearings to the end that said spindle may be maintained in its proper radial and axial position, under the stresses incident to grinding, by cooperating bearing members so constructed and lubricated as to minimize friction losses.

Another object of this invention is to provide a grinder spindle with associated radial and thrust bearings which may be easily and nicely adjusted to effect the desired relationship between the bearing surfaces thereof and against improper axial displacement.

Another object of this invention is to provide a grinder spindle with improved radial bearings including means for radially adjusting the bearing members to control the initial running clearance.

Another object of this invention is to provide a grinder spindle with improved radial bearings including means for applying a predetermined load thereto.

Another object of this invention is to provide a grinder spindle with improved radial bearings of the pivoted shoe type.

Another object of this invention is to provide a device of the type last characterized with means for radially predetermining the initial clearance of and the load on the shoes.

Another object of this invention is to provide grinder spindle bearings with improved means for predetermining the load thereon, which means are readily accessible and easily manipulated.

Another object of this invention is to provide a grinder spindle with an improved thrust bearing for predetermining the axial position of the grinder spindle.

Another object of this invention is to provide a grinder spindle with improved means for lubricating the bearing surfaces of its bearings.

Another object of this invention is to provide a grinder spindle with improved radial and thrust bearings which are relatively simple and durable in construction, easily installed, readily adjusted and highly efficient in operation.

Other objects will appear as the description of the invention proceeds.

The invention is capable of receiving a variety of mechanical expressions, one of which is shown in detail on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is an axial section, taken on line 1—1 of Fig. 2, of an embodiment of the present invention;

Fig. 3 is an enlarged section of a detail on the line 3—3 of Fig. 1; and

Fig. 4 is a fragmentary view generally corresponding to Fig. 3 but illustrating an alternative construction that may be employed for the support and adjustment of the adjustable bearing shoe.

Figure 2:
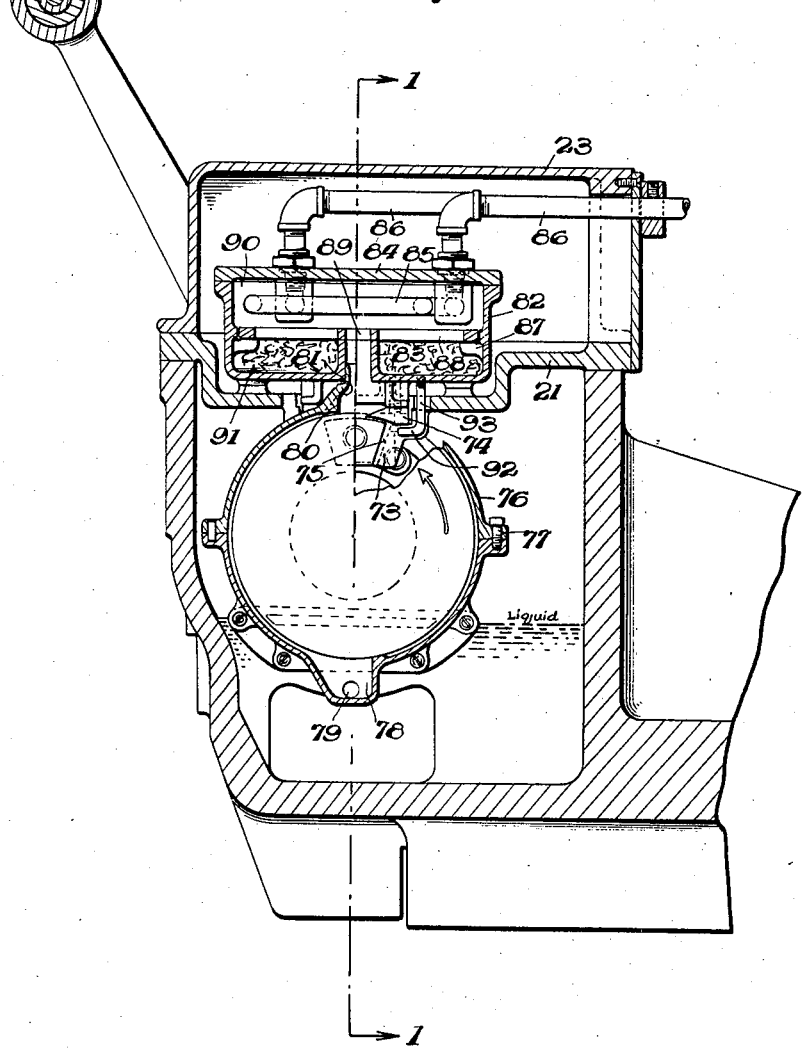
Fig. 2 is a cross section at the thrust collar of Fig. 1, the two parts of the figure, however, being taken on adjacent parallel transverse planes.

In the form shown the spindle 10, which may be of any suitable length and size, is provided adjacent one end with a grinder wheel 11, with its guard 12, indicated diagrammatically in dotted lines and which may be of any suitable character and construction and retained on the spindle in any suitable way, as by the nut 13. At its opposite end said spindle 10 is provided with any suitable driving mechanism here shown diagrammatically as a belt pulley 14 which together with its guard 15 is indicated in dotted lines, said belt pulley being suitably retained on the spindle, as by the nut 16. It is to be understood, however, that any other suitable driving mechanism may be applied to said spindle, the present invention not being concerned with the details of either the grinding mechanism or the driving mechanism.

Intermediate its length spindle 10 is provided in any suitable way with a thrust collar 17 which may be integral therewith or separate therefrom and retained thereon in any suitable way. Cooperating with said thrust collar 17 is a thrust bearing to be described hereinafter in detail, said thrust bearing cooperating with the opposed faces of said thrust collar 17 to predetermine the position of the spindle in the direction of its axis and retain said spindle against undue axial displacement.

Cooperating with the circumferential surface of said spindle adjacent each end thereof is a radial bearing to be hereinafter described in detail, whereby the spindle is supported and restrained against undue radial displacement and retained in its proper centered relationship under the stresses incident to the action of the driving and grinding mechanism.

Said thrust and radial bearings are preferably mounted in a casting 18 having a central chamber 19 in which the thrust bearing is disposed and which may also be of appropriate size to constitute a reservoir for the lubricating liquid. The ends of the casting are provided with bores 20 to receive the radial bearings hereinafter described, said bores being of sufficient diameter to permit axial movement of the thrust collar 17 therethrough if the casting is not so constructed in separable parts as to permit movement of the spindle into its bearings transversely of its length. The central chamber 19 is open at its top as shown, and said central opening is closed by a member 21 which preferably carries all of the elements of the thrust bearing, so that said thrust bearing may be moved into and out of its operative position as a unit. Member 21 is secured to the casting in any suitable way as by bolts or screws 22. In the form shown, filtering and cooling means for the lubricating liquid are associated with the thrust bearing and to this end the illustrated embodiment has a chambered cover 23 mounted over the member 21 and in which the filtering and cooling means are disposed, cover 23 being secured in position in any suitable way as by bolts or screws 24. Member 21 and cover 23 will be referred to in greater detail hereinafter.

As before pointed out, a radial bearing is disposed adjacent each end of the spindle 10, and as said bearings may be and preferably are of the same construction, it will be sufficient to describe one of said bearings in detail. Referring particularly to Fig. 3, wherein one of said radial bearings is shown in enlarged section, the bore 20 in casting 18 receives a cylindrical sleeve 25 which is machined to fit said bore 18 and which is provided with apertures 26 to locate the bearing elements, so that said sleeve 25 constitutes a cage whereby said bearing elements may be moved into and out of said bore 20 as a unit.

Said radial bearing is of the pivoted shoe type and preferably composed of three symmetrically arranged shoes 27, 28 and 29. Shoe 27 is preferably so disposed that its radial axis lies in substantially the direction of the reaction of the grinding wheel as it reacts on the piece being ground. As illustrated it is assumed that this reaction is horizontal, and therefore the shoe 27 is disposed with its axis in a horizontal plane, but it is to be expressly understood that if the direction of grinding reaction is at an angle to the horizontal the shoe 27 would be correspondingly changed in location. Shoes 28 and 29 are then arranged with their axes at 120° from the axis of the shoe 27, this disposition placing shoe 28 in a proper location to carry the majority if not all of the weight of the grinder spindle. The third shoe is utilized for the purpose of predetermining the running clearance and the load imposed on the spindle as hereinafter described. Said shoes 27, 28, 29 may be mounted for pivotal movement in any suitable way. As shown each of said shoes is provided in its rear face with a hardened insert 30 having a rear spherical surface 31, and in the case of shoes 27 and 28 said hardened inserts are mounted on suitable buttons 32 provided in recesses 33 in the inner wall of the bore 20. Therefore said shoes may tilt appropriately to establish and maintain proper bearing films between their bearing surfaces 34 and the peripheral surface of spindle 10. Shoes 27 and 28 are not adjustable.

To predetermine the initial running clearance the third shoe 29 is so mounted as to be adjustable in position. As shown, a tubular jackscrew 35 is mounted in a threaded opening in the wall of the casting, and has its inner end 36 concave and suitably shaped to afford a seat for the hardened insert 30 of the shoe 29. Therefore, by adjustment of said jackscrew 35 the shoe 29 may be adjusted in position so as to predetermine the initial clearance between the bearing surfaces of all three shoes and the peripheral surface of the spindle. Jackscrew 35 is provided with a suitable lock nut 37, and a suitable packing gland 38 is also shown to prevent escape of lubricating fluid along the thrust pin 39 which is disposed in the central aperture 40 extending through said jackscrew. Jackscrew 35 thus provides the preliminary adjustment of the radial bearing so that the desired clearance between the bearing surfaces thereof may be established to the end that the bearing films shall not be unduly thick, on the one hand, and to the end that seizure of the parts under expansion as they heat up shall be prevented, on the other hand.

Thrust pin 39 is a part of the mechanism provided for the purpose of applying a load to the radial bearing at any time it is needed and of any desired intensity, and to this end it is operated to engage the rear of the shoe 29, to lift it from its support on the jackscrew 35, and thus reduce the clearance between the bearing surfaces of the radial bearing to whatever amount is desirable, depending upon the viscosity of the lubricating liquid used, the speed of the spindle, the load applied, etc. Although separate means may be provided for thus imposing the desired load on the two radial bearings at opposite ends of the spindle, it is preferred to use a single means that will impose a like load on both radial bearings, and such a mechanism is embodied in the form illustrated, as may be seen by a comparison of Figs. 1 and 3.

Thrust pin 39 at its outer end engages an adjustable bolt 41 mounted in the arm 42 of a bell crank lever 43 suitably pivoted at 44 on lugs 45 projecting from the casting 18. Bolt 41 may be retained in adjusted position by a lock nut 46. So far the construction employed at each of the radial bearings is the same, the bell crank lever at the radial bearing disposed at the opposite end of the spindle as viewed in Fig. 1 being designated 47.

Pivoted to bell crank lever 43 at 48 is a link 49 having a shoulder at 50. Pivoted to the bell crank lever 47 at 51 is a link 52 threaded at 53. Links 49 and 52 project into a tubular guide element 54 which is centrally arranged in and supported from a plug 55 threaded into one end of a tubular spring case 56 having an aperture 57 through which the link 49 projects. As illustrated, a pin and slot at 58 may be provided at said aperture 57 to prevent relative rotation between the spring case and link 49. Disposed within the spring case 56 and surrounding the tubular guide element 54 is a coil spring 59 which reacts between the inner end of the threaded plug 55 and a collar 60 which may slide on the link 49 and which normally abuts against the shoulder 50. The outer end of plug 55 is provided with suitable spanner openings 61, so that said plug may be adjusted, and said plug may be locked in its adjusted position by a set screw 62. By rotating the plug 55 a predetermined tension may be placed upon the spring 59, so that said spring may be preloaded to the desired degree.

Under normal conditions spring 59 holds collar 60 against the inner end of spring case 56, and as it thus reacts at its opposite ends against said plug 55 and said collar 60 in engagement with spring case 56 which carries plug 55, no load is imposed thereby on either of the links 49 and 52. Threadedly mounted on the portion 53 of link 52 is a nut 63 provided with a handle or other suitable manipulating means 63a. When nut 63 is rotated on the thread 53 so as to move toward the left as viewed in Fig. 1, it thrusts the spring case 56 toward the left as viewed in said figure, so that the tension of the spring, acting through the collar 60, is now imposed on the shoulder 50 of the link 49, and thus the load on the spring 59 is transmitted to the bell crank lever 43. At the same time the reaction of the spring 59 through the threaded plug 55 on the nut 63 imposes a like load on the bell crank lever 47. Thus the load represented by the precompression of the spring 59, plus any additional load arising from the further compression of the spring 59 as the nut 63 is adjustably moved to the desired extent along its thread, is equally imposed upon both bell crank levers 43 and 47, and thereby said bell crank levers are actuated to move the thrust pins 39 inwardly to lift the shoes 29 off of the inner ends of the jackscrews 35 and thereby load the radial bearings, and decrease their clearances, to the desired extent. As the spring 59 is already precompressed to approximately the minimum load that it is desired to apply, the radial bearings may thus be loaded with a minimum of time and effort, and at the same time the means for applying the load are such that the amount of load applied can be nicely regulated by a simple manipulation of the handle 63a.

Referring to Fig. 4, an alternative support for the shoe 29 on the adjustable thrust pin 39 is illustrated, this alternative construction providing a more sensitive mounting for the shoe. As here illustrated the thrust pin 39 is provided with a mushroom-like head 64 having a spherical surface 65 on which the shoe 29 is mounted, said head 64 also providing a shoulder 66 which engages the end of the tubular jackscrew 35. In this construction the initial adjustment of the jackscrew moves the head 64 and thrust pin 39, but shoe 29 is at all times mounted on the spherical surface 65 of the head 64. Following said adjustment the bolt 41 is properly engaged with the end of the thrust pin 39, and thereafter when the load is to be imposed said thrust pin 39 is actuated from the bell crank lever in the manner heretofore described, the head 64 of the thrust pin 39 being thereby lifted from the end of the jackscrew 35.

It is not necessary that the shoes be in the same circumferential location at both ends of the spindle, and if the direction of applied stress at opposite ends of the spindle, due to the reaction of the grinding mechanism and the driving mechanism, are in angularly related planes, they would preferably not have the same circumferential location. Under such circumstances the two bell crank levers 43 and 47 would not normally lie in the same plane, but if the heretofore described mechanism to provide a common actuation for both bell crank levers is desired, one or both of said levers may be bent sufficiently so as to bring the links pivoted to the ends thereof into alignment. If preferred, however, separate load imposing means for the respective radial bearings may be provided, or the spring which imposes the load may be applied directly against the rear of the shoe with a suitable provision for adjusting its tension.

Referring now more particularly to Figs. 1 and 2, the thrust bearing is shown as composed of a single shoe 70 at each face of the thrust collar 5 and adjacent the top thereof. Each shoe is provided at its rear face with a hardened insert 71 and is pivotally mounted for both circumferential and radial tilting on the inwardly projecting end of a jackscrew 72 which projects to the exterior of the supporting element 73 where it may be readily engaged for adjustment to predetermine the clearance between the bearing face of the shoe and the bearing face of the collar 17. Each shoe is provided at each radial edge thereof with a tangentially extending lug 74 by which each shoe is suspended from the upper surface of the supporting element 73 and within a truncated recess 75, so that improper circumferential displacement of the shoe is prevented. As before pointed out, the supporting elements 73 are carried by the cover member 21, so that the pair of shoes 70 suspended by the lugs 74 within their truncated recesses 75 may be moved as a unit into and out of cooperative relationship with the opposed faces of the thrust collar. If preferred the truncated recesses 75 may be so formed as to provide an enclosure for the bearing shoes except at their bearing faces so that lubricant will be retained therein and said bearing shoes thereby run submerged in the lubricating liquid. Thus the thrust bearing is composed of readily accessible thrust elements which may be adjusted to predetermine the clearance between the same and the thrust collar, and whereby the axial position of the spindle may be nicely controlled. Said shoes may if desired be mounted in a sliding frame actuated by any suitable device for oscillating the spindle back and forth as is done in some grinding operations.

Any suitable means may be provided for lubricating the radial and thrust bearings. Thus pressure lubrication may be employed for either or both thrust and radial bearings, but in the embodiment illustrated viscosity pumping means are associated with the thrust collar for elevating the lubricant from the reservoir 19 to a chamber provided in cover 23 where it is properly cooled and filtered; after which it is distributed both to the radial bearings and to the shoes of the thrust bearings. As illustrated more particularly in Fig. 2, a suitable cylindrical wall 76 closely surrounds the periphery of the thrust collar, the same being made into semicircular sections suitably secured together as by bolts or screws 77 so that the same may be readily assembled around the thrust collar. The radially narrow circumferential space between the periphery of the thrust collar and the wall 76 is enlarged adjacent the bottom as shown at 78 and provided with one or more apertures 79 so that lubricating liquid may flow from the reservoir 19 into contact with the periphery of the thrust collar to be raised thereby to a lubricant-removing edge or member 80 of any suitable construction but here shown as the inner wall of a passage 81 on a tubular projection extending upwardly from the upper half of the wall 76. Thus the lubricating liquid removed by the edge 80 is deflected upwardly through passage 81.

Disposed above said lubricant-removing means are lubricant-cooling and filtering means. As here shown, a box-like structure 82 is suitably supported on the member 21 and has a central tubular passage 83 which registers with or may have telescopic engagement with the tubular passage 81. Box-like structure 82 is closed by a cover member 84 from which is supported a cooling coil 85 having inlet and outlet pipes 86 that project through suitable openings in the wall of the cover 23. Interiorly, box-like structure 82 is provided with suitable supporting lugs 87 and mounted on said lugs 87 is a filtering member 88 having a central aperture 89 in register with the tubular passage 83. Thereby the lubricating liquid removed from the periphery of the thrust collar by the lubricant-removing edge 80 is deflected upwardly through the passages 81, 83, 89 into the chamber 90 containing the cooling coil, where it is properly cooled. The lubricant can escape from chamber 90 only by flowing through the filtering material 88 into the chamber 91 below the same.

From chamber 91 the lubricating liquid may be led to either or both the thrust and radial bearing elements in any suitable way. As illustrated, the thrust bearing elements are lubricated by jet lubrication, and to this end each shoe 70 has adjacent its leading edge a jet 92 which is fed from the chamber 91 through pipe 93. The two radial bearings may also be supplied with lubricant from the chamber 91 as by pipes 94 indicated in Fig. 1, the lubricant being led to annual chambers 95 which communicate with the intershoe spaces of the radial bearings. Lubricating liquid may be returned to the reservoir by any suitable passages as indicated at 96 in Fig. 1.

For lubricating bearings of the character described, a very light lubricant such as kerosene is preferred so that the bearing films will be relatively thin. The thinner the films the less the absolute change in their thickness under the imposed load, though the percentage change of thickness may be the same. Thus with the bearing as heretofore described the grinder spindle may be very closely centered so that the load applied by the grinding mechanism will not appreciably change the film thickness or cause undue radial or lateral displacement of the grinder spindle. At the same time, the use of three shoes for the radial bearings, as heretofore described, eliminates the problem of load distribution.

Suitable means are also provided as indicated at 97 for sealing the ends of the bearing cavities so as to prevent escape of lubricating liquid along the spindle.

It will therefore be perceived that by the present invention a grinder spindle has been provided with improved radial and thrust bearings whereby the clearances between the bearing surfaces may be nicely predetermined to prevent improper displacement of the spindle either transversely or axially. In the radial bearings the bearing clearance may be closely set at the predetermined value desired, and load may thereafter be applied to the radial bearings by easily manipulated and readily accessible mechanism that functions with certainty to apply the same amount of load to both radial bearings. A thrust bearing has also been provided which includes readily accessible provisions for adjustment and which can be readily moved into and out of operating position as a unit, said bearing at the same time assuring against improper axial displacement of the spindle. Improved lubricating means have also been provided whereby copious quantities of lubricant are supplied to both the thrust and radial bearings, but before supply to said bearing surfaces the lubricating liquid is properly cooled and cleaned so that only cool clean lubricating liquid can reach said bearing surfaces. The entire structure is relatively simple, durable and compact in structure which facilitates standardization by the bearing manufacturer, it is readily assembled and disassembled and it is so constructed as to be highly efficient in operation.

While the embodiment of the invention illustrated on the drawings has been described with considerable particularity, it is to be expressly understood that the invention is not restricted thereto, as the same is capable of receiving a variety of mechanical expressions, some of which will now be apparent to those skilled in the art, while changes may be made in the details of construction, arrangement and proportion of parts, and certain features may be used without other features, without departing from the spirit of this invention. Reference is therefore to be had to the appended claims for a definition of said invention.

What is claimed is:

1. In a bearing structure for grinder spindles, in combination with a grinder spindle, a pair of radial bearings disposed adjacent the opposite ends of said spindle each comprising a plurality of pivotally mounted bearing shoes, a hollow support for one of the shoes of each bearing and on which said shoe seats for predetermining the initial running clearance, and common means adapted to be projected through the hollow support associated with each bearing for lifting the corresponding shoe from its support and predetermining the load on both of said radial bearings.

2. In a bearing structure for grinder spindles, in combination with a grinder spindle, a pair of radial bearings disposed adjacent the opposite ends of said spindle, each of said radial bearings including a plurality of symmetrically arranged pivotally mounted bearing shoes, a hollow support for a single shoe of each bearing on which said shoe seats for predetermining the initial clearance between said shoes and said spindle, and means acting through said hollow supports for predetermining the load on said bearings.

3. In a bearing structure for grinder spindles, in combination with a grinder spindle, a pair of radial bearings disposed adjacent the opposite ends of said spindle, each of said radial bearings including a plurality of symmetrically arranged pivotally mounted shoes, a hollow support on which a shoe of each of said radial bearings seats for initially predetermining the clearance on said radial bearing, and common means adapted to be projected through the hollow support associated with each bearing for lifting the corresponding shoe from its support and equalizing the load on said bearings.

4. In a bearing structure for grinder spindles, a radial bearing including a plurality of pivotally mounted shoes cooperating with said spindle, means for initially adjusting the clearance between one of said shoes and said spindle, and a second means cooperating with the same shoe for removing the same from said first named means and predetermining the load on said spindle.

5. In a bearing structure for grinder spindles, a radial bearing including a plurality of pivotally mounted shoes cooperating with said spindle, a hollow jackscrew cooperating with one of said shoes for predetermining the initial clearance between said shoes and said spindle, and means acting through the hollow jackscrew for lifting said shoe off of said jackscrew and predetermining the load on said radial bearing.

6. In a bearing structure for grinder spindles, a radial bearing including a plurality of pivotally mounted shoes cooperating with said spindle, a hollow jackscrew for predetermining the initial clearance between one of said shoes and said spindle, a thrust pin acting through said jackscrew and cooperating with said shoe, and means for imposing a predetermined but variable load on said thrust pin.

7. In a bearing structure for grinder spindles, a radial bearing including a plurality of pivotally mounted shoes cooperating with said spindle, a support for one of said shoes, a thrust pin acting through said support and cooperating with said shoe, and means for imposing a predetermined load on said thrust pin, said means including a spring under predetermined tension, a lever cooperating with said thrust pin and associated with said spring, and means for applying the tension of said spring to said lever.

8. In a bearing structure for grinder spindles, a radial bearing including a plurality of pivotally mounted shoes cooperating with said spindle, a support for one of said shoes, a thrust pin acting through said support and cooperating with said shoe, and means for imposing a predetermined load on said thrust pin, said means including a bell crank lever cooperating with said thrust pin, a link pivoted to said bell crank lever, a spring case surrounding said link and containing a coil spring under tension, and means for transferring the tension of said spring from said case to said link.

9. In a bearing structure for grinder spindles, a radial bearing including a plurality of pivotally mounted shoes cooperating with said spindle, a hollow support upon which one of said shoes is adapted to seat and which support predetermines the initial clearance between the spindle and the bearing, and means operable from the exterior of the bearing and projecting through said support for lifting said shoe off of said seat to predetermine the load on said radial bearing.

10. In a bearing structure for grinder spindles, a radial bearing including a plurality of pivotally mounted shoes cooperating with said spindle, a support upon which one of said shoes is adapted to seat, and means for lifting said shoe off of said support to predetermine the load on said radial bearing, said last named means including a pin having a head with a spherical surface on which said shoe is pivotally mounted at all times, and means for exerting a thrust on said pin to lift said head off said support.

11. In a bearing structure for grinder spindles, in combination with a spindle, a pair of radial bearings cooperating with opposite ends of said spindle, each of said spindle bearings including a plurality of symmetrically arranged pivotally mounted bearing shoes, means for predetermining the clearance between a shoe of each of said radial bearings and said spindle, and common means acting through the aforesaid shoe of each of said radial bearings for predetermining the load on said radial bearings.

12. In a bearing structure for grinder spindles, in combination with a spindle, a pair of radial bearings cooperating with opposite ends of said spindle, each of said spindle bearings including a plurality of symmetrically arranged pivotally mounted bearing shoes, means for predetermining clearance between a shoe of each of said radial bearings and said spindle, and common means acting through the aforesaid shoe of each of said radial bearings for predetermining the load on said radial bearings, said last named means including thrust pins acting on said shoes and a common means for imposing an equal load on both of said thrust pins.

13. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, and a common means for applying an equal load to each of said thrust pins.

14. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, bell cranks adapted to apply thrust to said thrust pins, and a common means for applying equal and opposite forces to said two bell cranks.

15. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, bell cranks cooperating with the aforesaid thrust pins, a spring case containing a spring under predetermined tension associated with both of said bell cranks, and manually operable means for transferring the tension of said spring to said bell cranks.

16. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, bell cranks cooperating with said thrust pins, a spring case containing a spring under predetermined tension associated with said bell cranks, and means for transferring the tension of said spring to said bell cranks, said last named means providing for variable increase of the load transmitted to said bell cranks.

17. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, bell cranks cooperating with said thrust pins, a spring case containing a spring, means associated with said case and spring for predeterminately compressing said spring, means associating said spring case and spring with said bell cranks without imposing the tension of said spring on said bell cranks, and means for transferring the tension of said spring to said bell cranks.

18. In a bearing structure for grinder spindles, in combination with a spindle, a pair of radial bearings cooperating with opposite ends of said spindle, each of said spindle bearings including a plurality of symmetrically arranged pivotally mounted bearing shoes, and common means acting on a single shoe of each of said radial bearings for predetermining the load on said radial bearings, said last named means including thrust pins acting on the aforesaid shoes, bell cranks cooperating with said thrust pins, a spring case containing a spring, means associated with said case and spring for predeterminately compressing said spring, means for associating said spring case and spring with said bell cranks without imposing the tension of said spring on said bell cranks, and means for transferring the tension of said spring to said bell cranks, said last named means adapted to variably increase the tension of said spring to vary the load on said thrust pins.

ALBERT KINGSBURY.